United States Patent
Tanaka

(10) Patent No.: US 12,400,463 B2
(45) Date of Patent: Aug. 26, 2025

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Shoji Tanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 481 days.

(21) Appl. No.: 17/687,758

(22) Filed: Mar. 7, 2022

(65) Prior Publication Data

US 2022/0292857 A1  Sep. 15, 2022

(30) Foreign Application Priority Data

Mar. 9, 2021  (JP) ................... 2021-037211

(51) Int. Cl.
 *G06V 30/12* (2022.01)
 *H04N 1/00* (2006.01)

(52) U.S. Cl.
 CPC .......... *G06V 30/133* (2022.01); *G06V 30/127* (2022.01); *H04N 1/00331* (2013.01)

(58) Field of Classification Search
 CPC ............................. G06V 30/00–43
 See application file for complete search history.

(56) References Cited

U.S. PATENT DOCUMENTS 8,417,017 B1 * 4/2013 Beutel ............... G07D 7/0047
340/5.86
8,515,751 B2 * 8/2013 Zanolin ............... G06F 40/232
704/235

(Continued)

FOREIGN PATENT DOCUMENTS

CN  105825214 A  8/2016
JP  H08-016730 A  1/1996

(Continued)

OTHER PUBLICATIONS

Notice of Reasons for Refusal issued by the Japanese Patent Office on Dec. 10, 2024 in corresponding JP Patent Application No. 2021-037211, with English translation.

(Continued)

*Primary Examiner* — Sean T Motsinger
(74) *Attorney, Agent, or Firm* — Carter, DeLuca & Farrell LLP

(57) ABSTRACT

The present disclosure prevents learning a miscorrection made by a user on an OCR result. Provided is an information processing apparatus including: a character recognition unit configured to extract a character string containing at least one character by performing character recognition on an image obtained by scanning of a document; a display control unit configured to display the extracted character string on a display apparatus; an obtaining unit configured to receive a user correction on the extracted character string and obtaining a corrected character string based on the user correction; and a learning unit configured to learn a correction characteristic of a difference portion between the extracted character string and the corrected character string. The learning unit does not learn the correction characteristic of the difference portion in a case where a reliability level of the character recognition on the difference portion is equal to or above a predetermined threshold.

11 Claims, 13 Drawing Sheets

(56) References Cited

U.S. PATENT DOCUMENTS

| | | | |
|---|---|---|---|
| 9,286,526 B1* | 3/2016 | Manohar | G06V 30/127 |
| 2002/0156816 A1* | 10/2002 | Kantrowitz | G06F 40/253 |
| | | | 715/256 |
| 2005/0265602 A1* | 12/2005 | Tashiro | G06V 30/2504 |
| | | | 382/185 |
| 2009/0164881 A1* | 6/2009 | Segarra | G06V 30/1444 |
| | | | 715/256 |
| 2009/0274369 A1* | 11/2009 | Sano | G06V 10/987 |
| | | | 707/999.1 |
| 2015/0139559 A1 | 5/2015 | Smith | |
| 2016/0379048 A1* | 12/2016 | Kumar | G06V 30/333 |
| | | | 382/189 |
| 2020/0293810 A1* | 9/2020 | Kanada | G06N 3/045 |
| 2020/0327352 A1* | 10/2020 | Brandt | G06V 10/82 |
| 2020/0372293 A1* | 11/2020 | Li | G06V 30/1983 |
| 2021/0099586 A1* | 4/2021 | Tanaka | H04N 1/00331 |
| 2021/0303895 A1* | 9/2021 | Soga | H04N 1/00331 |
| 2022/0292857 A1* | 9/2022 | Tanaka | H04N 1/00331 |
| 2023/0135880 A1* | 5/2023 | Song | G06V 30/40 |
| | | | 382/159 |

FOREIGN PATENT DOCUMENTS

| | | |
|---|---|---|
| JP | H11-184976 A | 7/1999 |
| JP | 2001-297306 A | 10/2001 |
| JP | 2004-046388 A | 2/2004 |
| JP | 2008-108153 A | 5/2008 |
| JP | 2012-043385 A | 3/2012 |
| JP | 2014-157409 A | 8/2014 |
| JP | 2014-194694 A | 10/2014 |
| JP | 2016-126796 A | 7/2016 |
| JP | 2018-156308 A | 10/2018 |
| JP | 2020-046721 A | 3/2020 |
| JP | 2020-046857 A | 3/2020 |
| JP | 2020-052502 A | 4/2020 |

OTHER PUBLICATIONS

Miyahara, S. & Suzuki, A., "A Confirmation and Modification Method of Character Recognized Results Using a Pattern for Pattern Matching" The Institute of Electronics, Information and Communication Engineers (Sep. 1994) pp. 1735-1743, vol. J77-D-II, No. 9, with English abstract.

Abdulkader, A. et al., "Low Cost Correction of OCR Errors Using Learning in a Multi-Engine Environment" 2009 10th International Conference on Document Analysis and Recognition, IEEE (Jul. 2009) pp. 576-580.

Notice of Reasons for Refusal issued by the Japanese Patent Office on Feb. 25, 2025 in corresponding JP Patent Application No. 2021-037211, with English translation.

* cited by examiner

INVOICE

Bill to:
ABC INC.

XYZ Corporation
1-2-3 ××××,
YYYY-ku,Tokyo 123-4567
TEL :03-123-4567

Please check your payment.

invoice amount : $112.86

| No | Product Name | Amount | Unit Price | Charge |
|---|---|---|---|---|
| 1 | pipe chair | 1 | 44.50 | 44.50 |
| 2 | garbage can | 2 | 30.00 | 60.00 |
|  |  |  |  |  |
|  |  |  |  |  |
|  |  |  |  |  |
|  |  |  |  |  |
|  |  |  | Subtotal | 104.50 |
|  |  |  | Tax | 8.36 |
|  |  |  | Total | 112.86 |

REMITTANCE INFORMATION
Bank Name : AAA Bank
Account No. : 0123456
Account Name : XYZ CORP

INFORMATION PROCESSING APPARATUS, INFORMATION PROCESSING METHOD, AND RECORDING MEDIUM

BACKGROUND OF THE INVENTION

Field of the Invention

The present disclosure relates to a technique for assisting data input with respect to optical character recognition results.

Description of the Related Art

Optical character recognition (OCR) is widely known as a technique for converting a document image (a scanned image) obtained by scanning of a document or a business form containing hand-written or typed characters into character codes for computers. A scanner in a multi-function printer (MFP) or the like or a camera function in a smartphone or the like can be used to obtain a scanned image.

Since scanned document images vary in their image quality and condition of characters, OCR is typically not 100% accurate, containing false recognition to a small or great extent. A user needs to correct characters falsely recognized by OCR by, e.g., directly inputting correct characters. However, the work for locating, selecting, and correcting a falsely recognized portion in a character string is cumbersome, putting a heavy load on the user in a case where they have to handle a lot of documents.

Meanwhile, Japanese Patent Laid-Open No. 2008-108153 discloses a technique for learning the result of a correction made by a user on an OCR result and automatically revising OCR results based on what has been learned. In this technique, in a case where an OCR result and the result of an input made by a user are different from each other, a character string before the correction and a character string after the correction are associated with each other and registered as learning data, and from then on, OCR results are corrected based on the learning data. This technique can reduce an input-making burden on a user especially in a case where a document to be processed includes the same content as one processed before and there is a high possibility for the OCR results to include the same error. However, the technique of Japanese Patent Laid-Open No. 2008-108153 registers character strings before and after correction as learning data even in a case where a correction made by a user is a miscorrection due to the user's erroneous input, and this may cause incorrect revision to be made.

Japanese Patent Laid-Open No. 2014-194694 discloses a technique for verifying user correction results to prevent an erroneous input made by a user to correct an OCR result. A portion which is highly likely to be a user's erroneous input is identified based on a corrected character string, which is a character string obtained by a user by correcting OCR results, and the likelihood of accurateness (confidence level) of each character in the OCR results, and a user is notified that the correction is suspected to be incorrect. This can reduce the probability of a user making a miscorrection at the time of correcting character strings.

The technique described in Japanese Patent Laid-Open No. 2014-194694, however, cannot prevent a miscorrection that has already been made by a user from being learned in association with the OCR result.

SUMMARY OF THE INVENTION

An information processing apparatus according to the present disclosure includes: a character recognition means that extracts a character string containing at least one character by performing character recognition on an image obtained by scanning of a document; a display control means that displays the extracted character string on a display apparatus; an obtaining means that receives a user correction on the extracted character string and obtaining a corrected character string based on the user correction; and a learning means that learns a correction characteristic of a difference portion between the extracted character string and the corrected character string. Here, the learning means does not learn the correction characteristic of the difference portion in a case where a reliability level of the character recognition on the difference portion is equal to or above a predetermined threshold.

Further features of the present invention will become apparent from the following description of exemplary embodiments with reference to the attached drawings.

BRIEF DESCRIPTION OF THE DRAWINGS

FIG. 5 is a diagram showing an example of a document to be processed;

FIG. 6 is a diagram showing an example of a screen for implementing extraction of items from a document image;

DESCRIPTION OF THE EMBODIMENTS

Embodiments of the present disclosure are described below based on the drawings. It should be noted that the embodiments do not limit the present disclosure and that not all the configurations described in the embodiments are necessarily essential as means for solving the problem to be solved by the present disclosure.

First Embodiment

System Configuration

Figure 1:
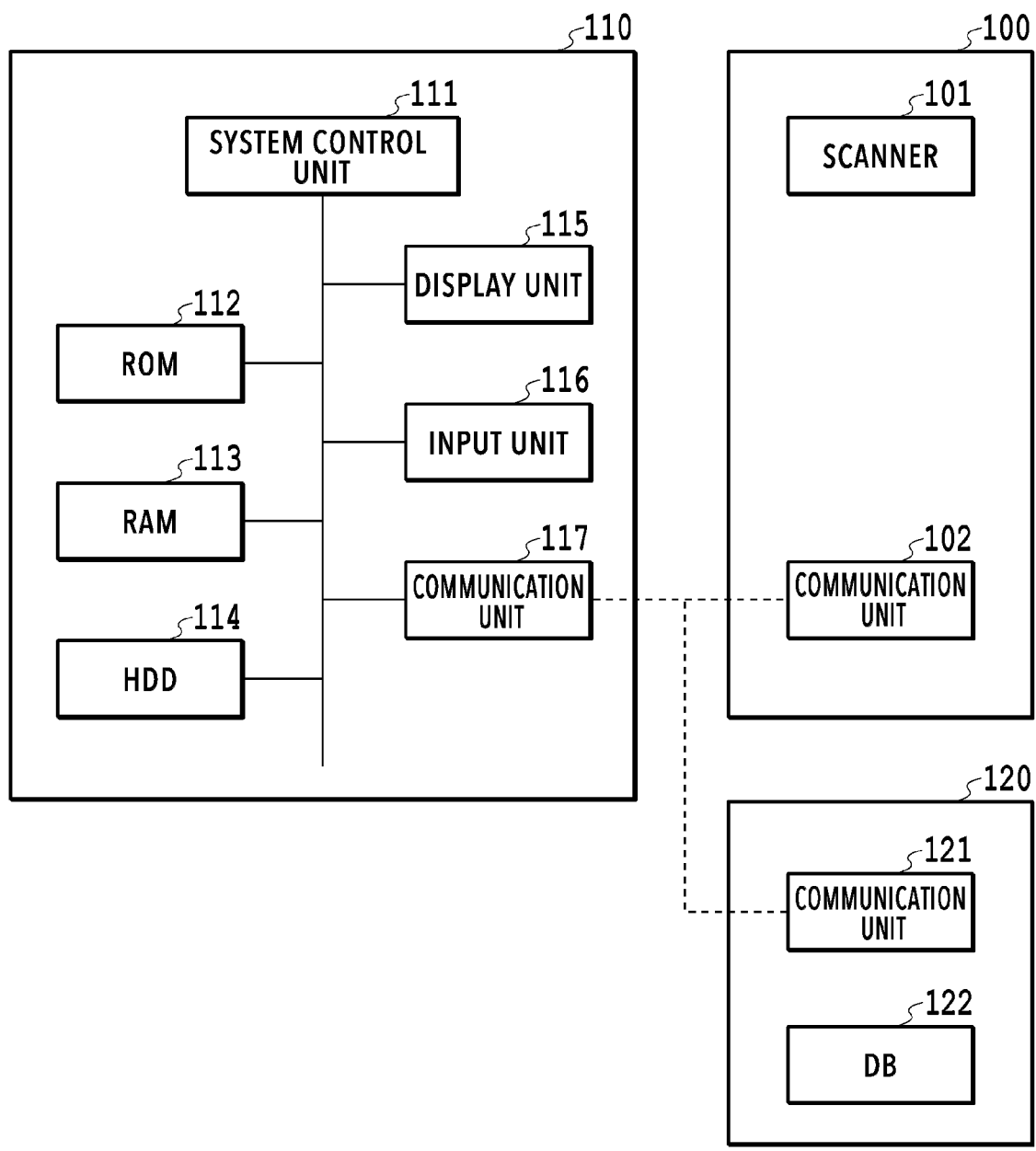
FIG. 1 is a diagram showing the system configuration of a data input assistance apparatus.

FIG. 1 is a diagram showing an information processing system according to a first embodiment. The information processing system has a scanning apparatus 100, an information processing apparatus 110, and a data management apparatus 120, The scanning apparatus 100 has a scanner 101 and a communication unit 102. The scanner 101 scans a document and generates a document image obtained by the scanning. The communication unit 102 communicates with an external apparatus via a network.

The information processing apparatus 110 has a system control unit 111 such as a CPU, a read-only memory (ROM) 112, a random-access memory (RAM) 113, a hard disk drive (HDD) 114, a display unit 115, an input unit 116, and a communication unit 117. The system control unit 111 reads control programs stored in the ROM 112 and executes various kinds of processing. The RAM 113 is used as a temporary storage area, such as main memory or work area, for the system control unit 111. The HDD 114 stores various kinds of data, various programs, and the like. Note that the functions of and processing by the information processing apparatus 110 to be described later are implemented by the system control unit 111 by reading the programs stored in the ROM 112 or the HDD 114 and executing the programs.

The communication unit 117 performs processing for communicating with an external apparatus via a network. Display of the display unit 115 is controlled by the system control unit 111 to display various pieces of information. Specifically, an apparatus for implementing the display unit 115 may be an operation panel 201 incorporated in an MFP, like the one shown in FIG. 2, or a display coupled to a PC capable of communicating with the information processing apparatus 110 via a network. The input unit 116 has a keyboard and/or a mouse and receives various operations made by a user. Note that the display unit 115 and the input unit 116 may be implemented as an integral apparatus such as a touch panel. Also, the display unit 115 may be configured such that a projector projects an image, and the input unit 116 may be configured such that a camera recognizes the position of a fingertip relative to the image projected.

The data management apparatus 120 has a database 122 and manages information used by the information processing apparatus 110 and information generated by the information processing apparatus 110. The data management apparatus 120 may be a server managed on premise or may be managed in a cloud environment. The data management apparatus 120 communicates with the information processing apparatus 110 via a communication unit 121 to transmit and receive data managed in the database 122. The information processing apparatus 110 manages data received from the data management apparatus 120 in the RAM 113 or the HDD 114 and uses the data for processing performed by the information processing apparatus 110.

In the present embodiment, the scanner 101 of the scanning apparatus 100 scans a paper document such as a business form and generates a document image obtained by the scanning. The document image thus generated is transmitted from the communication unit 102 on the scanning apparatus side to the information processing apparatus 110. In the information processing apparatus 110, the communication unit 117 on the information processing apparatus side receives the document image obtained by the scanning and stores the image in a storage apparatus such as the HDD 114. Note that the scanning apparatus 100 may have some of the functions of the display unit 115 and the input unit 116.

[UI]

Figure 2:
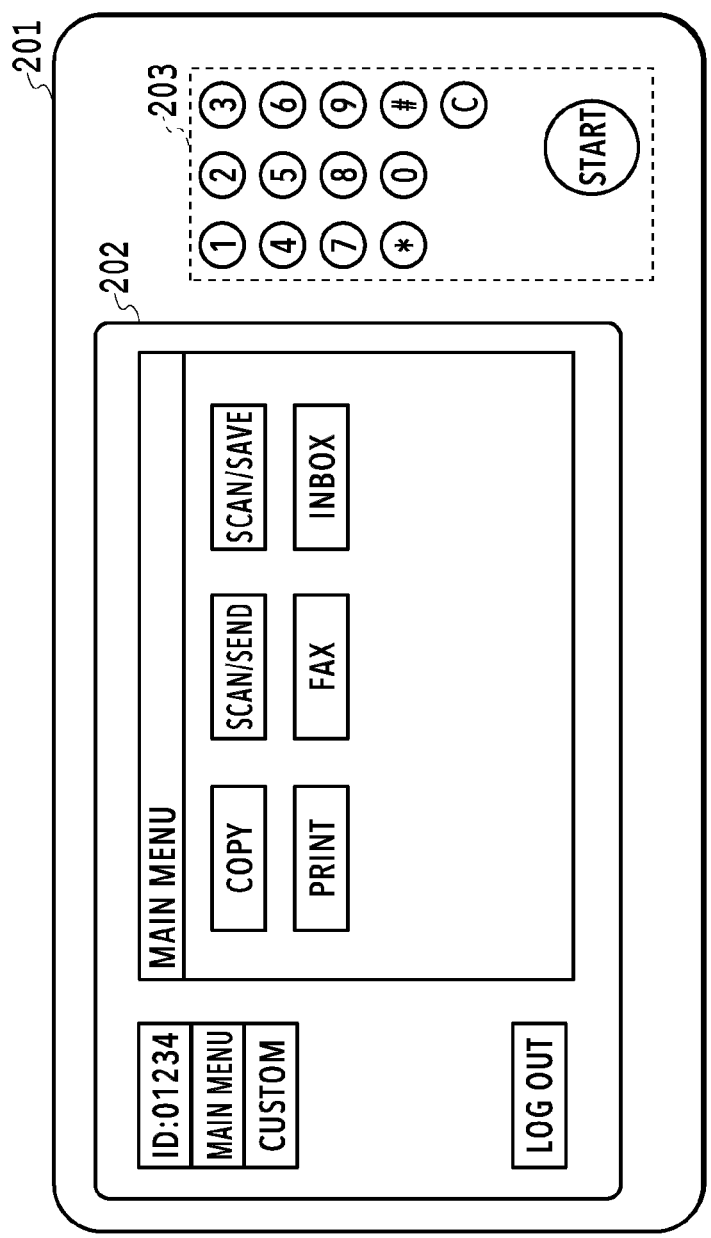
FIG. 2 is a diagram showing an example of an operation panel implementing an UI of the information processing apparatus 110.

FIG. 2 is a diagram showing an example of the operation panel 201 implementing a user interface (UI) formed by the display unit 115 and the input unit 116 of the information processing apparatus 110 in the present embodiment. The operation panel 201 includes a touch panel 202 and a numeric keypad 203 functioning as the display unit 115 and the input unit 116, respectively. The ID of a logged-in user, a main menu, and the like are displayed on the touch panel 202.

Figure 6:
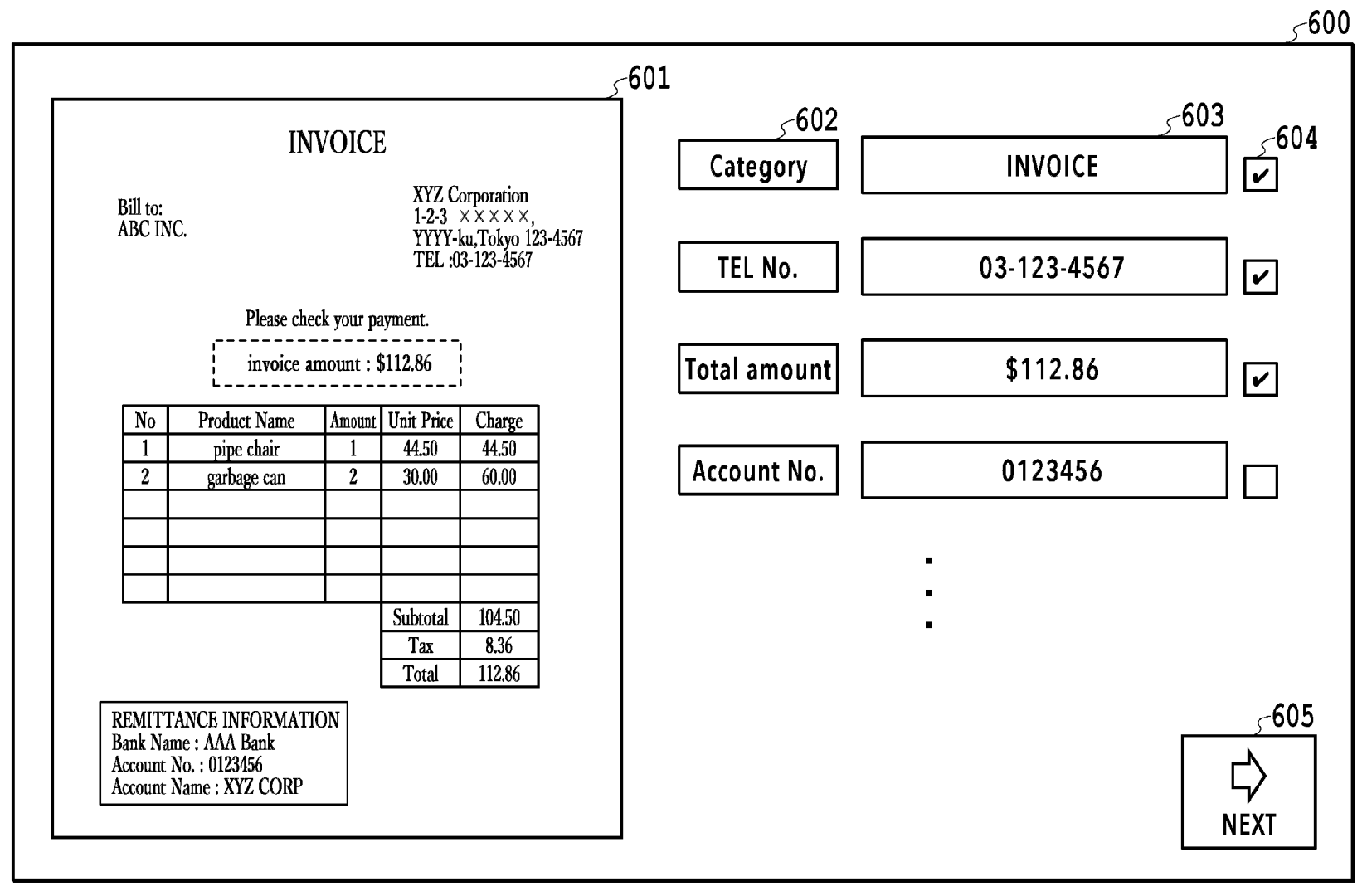
Figure 10:
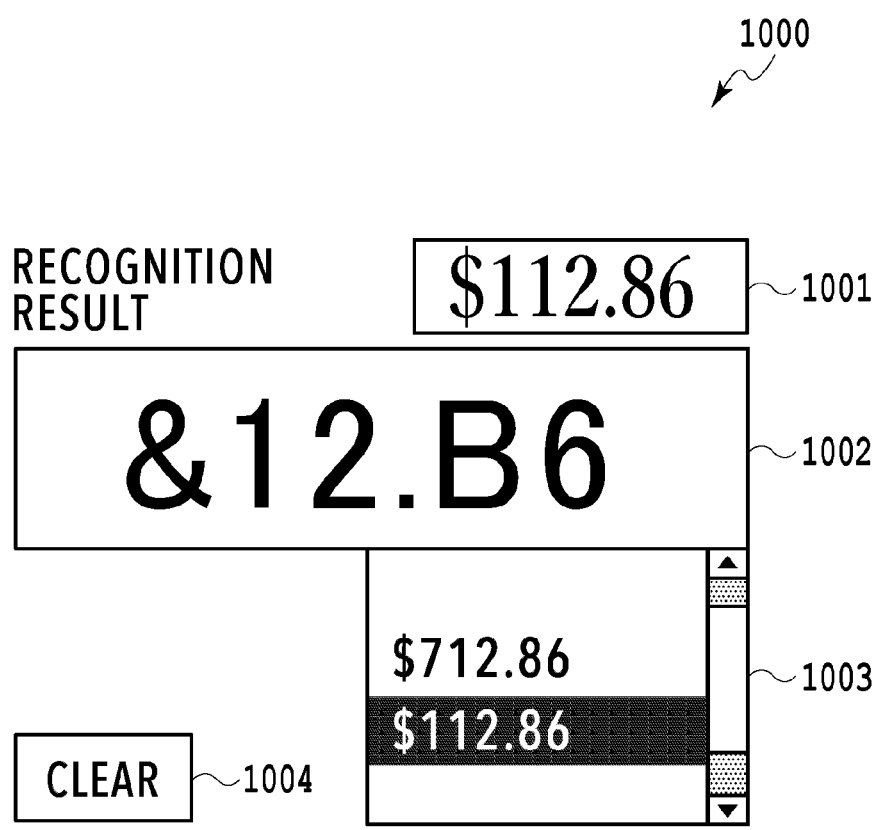
FIG. 10 is a diagram showing an example of a screen used by a user to select a revision result.

In the present embodiment, the UI presents a user with information extraction results obtained from a document to be processed like the one shown in FIG. 6, OCR results, and character string revision results obtained revising the OCR results. The UI also presents a user with revision character string candidates displayed as a list as shown in FIG. 10 and a miscorrection noting screen 1200 like the one shown in FIG. 12. The UI is displayed on the touch panel 202 here, but the various pieces of information displayed by the UI may be displayed on a display coupled to a PC capable of communicating with the information processing apparatus 110, and various operations made by a user may be received from the keyboard or mouse of the PC.

[Software Configuration]

Figure 3:
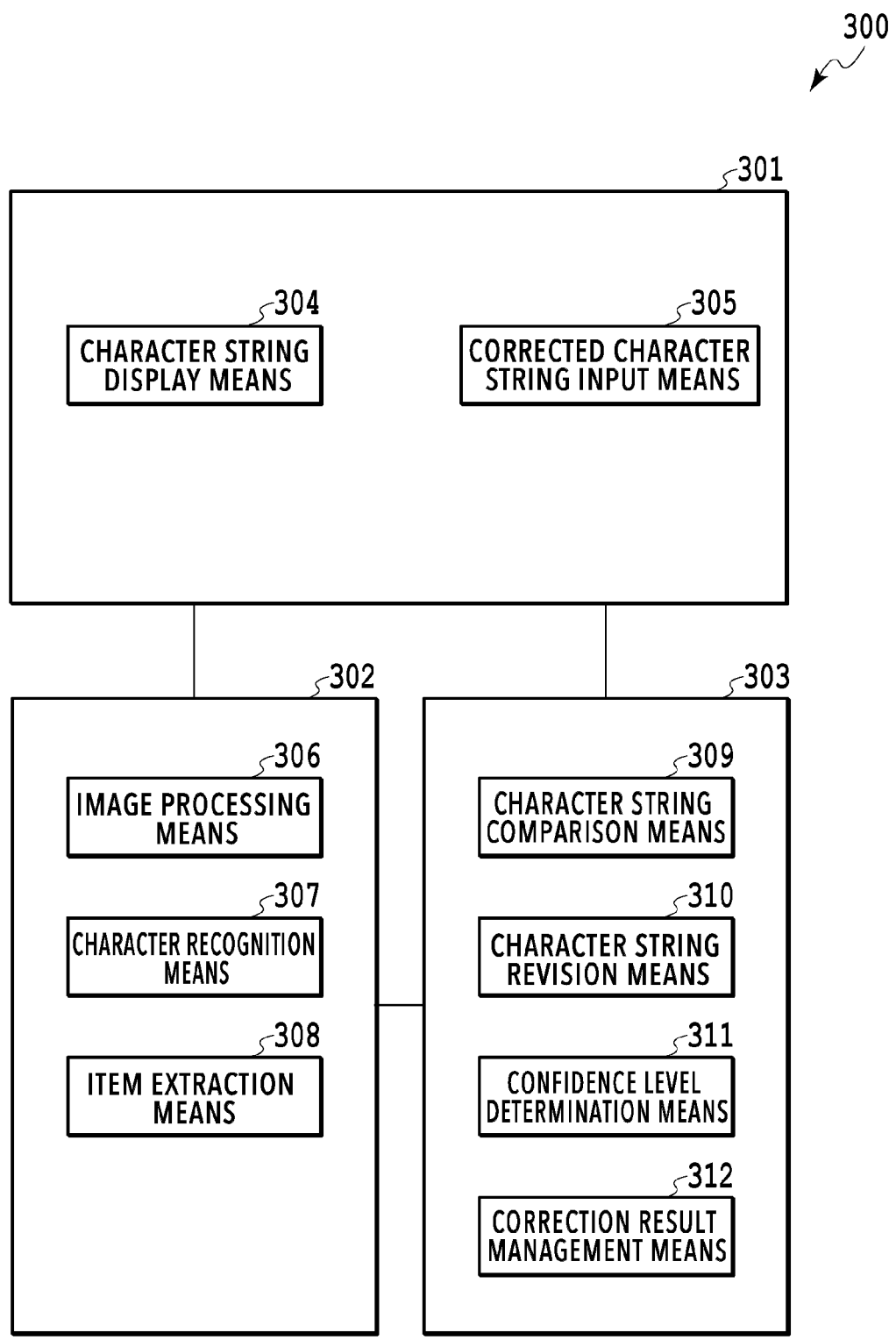
FIG. 3 is a diagram showing the software configuration of a means that implements the data input assistance apparatus of the first embodiment.

FIG. 3 is a diagram showing a software configuration implementing a data input assistance unit 300. The data input assistance unit 300 is formed by means (304 and 305) in a processing result provision unit 301, means (306 to 308) in a character recognition result generation unit 302, and means (309 to 312) in a character string revision unit 303.

The processing result provision unit 301 includes a character string display means 304 that displays character recognition results, which are OCR results, or a character string revision result obtained by revising the character recognition results. The processing result provision unit 301 further includes a corrected character string input means 305 that inputs a corrected character siring obtained as a result of a user correction made on a character string obtained as character recognition results. The processing result provision unit 301 provides a user with processing results obtained by the character recognition result generation unit 302 and the character string revision unit 303 and transmits an input received from the user to the character string revision unit 303. The processing result provision unit 301 functions as the above-described UI and is implemented by, for example, the touch panel 202 of the information processing apparatus 110 or a PC capable of communicating the information processing apparatus 110.

The character recognition result generation unit 302 is formed by an image processing means 306, a character recognition means 307, and an item extraction means 308. The image processing means 306 performs preprocessing on an inputted document image so that character recognition can be performed on the image. The character recognition means 307 converts character strings in the image into character codes (or performs OCR processing). The item extraction means 308 extracts a character string in the region needed by the user from the document image. Thus configured, the character recognition result generation unit 302 generates character recognition results by executing character recognition on a document image inputted to the information processing apparatus 110 and extracts, from the character recognition results, an item value corresponding to the name of an item to be extracted.

The character string revision unit 303 is formed by a character string comparison means 309, a character string revision means 310, a confidence level determination unit 311, and a correction result management unit 312. The character string comparison means 309 compares OCR results obtained by the character recognition means 307 or a revised character string generated by the character string revision means 310 to be described later with a user-corrected character string inputted by the corrected character string input means 305. The character string revision means 310 generates a revised character string obtained by revising OCR results. The confidence level determination unit 311 determines, for each character obtained by the character recognition means 307, the likelihood of accurateness of the recognition. The correction result management unit 312 manages comparison results generated by the character string comparison means 309 and character strings obtained by the corrected character string input means 305 or abstracted representations thereof. A comparison result is information associating characters before and after replacement between a pre-correction character string and a post-correction character string. The comparison results and the character strings or abstracted representations thereof are used in item value correction performed in S407 in FIG. 4. The correction result management unit 312 is implemented by the HDD 114 of the information processing apparatus 110 or the database 122 of the data management apparatus 120 in FIG. 1. Thus configured, the character string revision unit 303 receives the result of a user correction on an item value from the processing result provision unit 301, detects, registers, and learns the content of the correction, and generates revision candidates for the character recognition results based on what has been learned and registered.

Specific operations of the above various means will be described in concrete terms using the flowchart shown in FIG. 4.

[Processing Flowchart]

Figure 4:
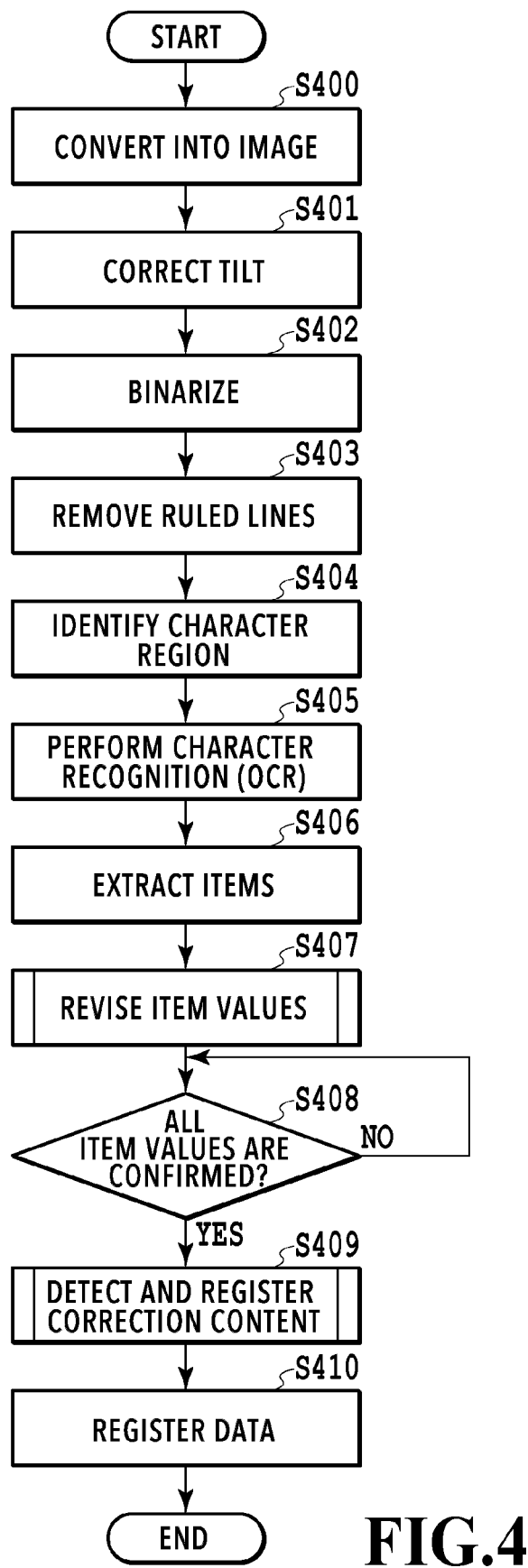
FIG. 4 is a diagram illustrating the process of processing performed by the data input assistance apparatus.

FIG. 4 is a flowchart showing the sequence of steps of processing in which a document image obtained by the scanning apparatus 100 by scanning is inputted to the information processing apparatus 110, a user checks and corrects the OCR results, and correction content is registered in the system.

First in S400, the scanning apparatus 100 scans a document with the scanner 101 and generates a document image. A document scanned is, for example, an invoice as shown in 500 in FIG. 5.

In S401, the image processing means 306 corrects a tilt of the document image, which has been converted into an image, by detecting the direction in which the character strings are written in the document.

In S402, the image processing means 306 performs binarization processing on the grayscale document image by setting a predetermined threshold thereto.

In S403, the image processing means 306 removes ruled lines unnecessary for character recognition from the binarized document image.

The processing performed from these steps S401 to S403 is regarded as preprocessing to accurately execute the subsequent steps, namely, character region identification in S404 and character recognition in S405.

In S404, the character recognition means 307 identifies character regions in the preprocessed document image.

In S405, the character recognition means 307 performs character recognition processing (OCR processing) on the document image based on the results of the character region identification, and obtains character codes as OCR results from each character region in the document image detected in S404.

In S406, the item extraction means 308 extracts, from the document image, an item value for each of predetermined item names that the user needs. Taking the invoice in FIG. 5 as an example, item values corresponding to the item names "TEL No." and "Total amount" are, for example, "03-123-4567" and "$112.86", respectively. The item names and item values extracted here are registered in the system in S409 to be described later. Reference numeral 600 in FIG. 6 denotes an example of a screen presented to a user in the event of item extraction. Reference numeral 601 denotes a preview image of the document image being processed, 602 denotes an item name display section where an extraction target item name is shown, 603 denotes an item value display section where the item value extracted from the document image 601 is shown.

The item value extraction processing is implemented by, for example, a user specifying, in the document image 601, a region where the item value to be extracted is written. In a different method for the item value extraction processing, a character string related to the item name shown in the item name section 602 is searched for in the document image 601, and based on the predefined positional relation between the character string and an item value, a necessary item value is extracted from the position of the character string found. In this way, an item value corresponding to an item name can be extracted automatically without any instructions from a user. For instance, in a case of extracting an item value "$112.86" for the item name "Total amount," a character string related to "Total amount," such as "Billed amount," is searched for in the document of the document category being processed (an invoice in this case). In a case where a character string "Billing amount" is found in the document as a result, an item value "$112,86" is extracted based on the position of the character string thus searched for and the positional relation between "Billing amount" and an item value of the monetary amount corresponding thereto, the positional relation being predefined and stored in the information processing apparatus 110. In this case, an item value "$112,86" is extracted based on a rule that "the item value of a monetary amount is on the right side of the character string "Billing amount"." The above item value extraction method is merely an example and is not limitative, and any other methods may be employed as long as they allow information desired by a user to be extracted.

In S407, the character string revision means 310 performs character string revision on the item values extracted, as needed. The OCR results for the extraction target image regions, which are item value extraction results, may contain false recognition depending on the quality of the document image 601. Thus, in S407, character string revision is performed on the extracted item values based on information obtained in the past by the corrected character string input means 305 and the character string comparison means 309 in FIG. 3. Specific processing for this item value revision will be described using a flowchart shown in FIG. 7.

After that, the revised character strings of the item values are displayed by the character string display means 304. Reference numeral 603 in FIG. 6 shows an example of what is displayed, and one character string is displayed for each item name as an item value corresponding to the item name. In another example, as shown in FIG. 10, OCR results 1002 for a character recognition target image 1001 and revision character string candidates 1003 for the item value obtained in S407 may be displayed for each extracted item. In a case where OCR results are displayed along with a plurality of revision character string candidates therefor as shown in FIG. 10, a user can select either the OCR results or a revision character string candidate that the user determines as being correct or closest from the revision character string candidates displayed as a list. In a case where the list does not have a character string desired by the user, the user can press a CLEAR button 1004 to clear the revision character string candidates being displayed and input a desired character string using the input unit 116. This user correction on the character string obtained by OCR is performed using the corrected character string input means 305 in FIG. 3. In other words, a user can either correct a character string after first selecting a revision character string candidate closest to the desired character string from the revision character string candidates 1003 or directly correct the character string of the OCR results without selecting any from the revision character string candidates 1003. In the present example, after checking and correcting the items, a user can confirm the item value of each item name by checking a corresponding checkbox 604.

In S408, upon detection that the checkboxes 604 for all the items have been checked, a "NEXT" button 605 is enabled, Once the user presses the NEXT button, i.e., in a case where all the items have been checked and corrected (YES in S408), processing proceeds to S409.

In S409, a correction characteristic is learned by detection of a user correction on each item and registration of correction content. Here, the content of a user correction is identified based a difference portion between a pre-correction character string and a user-corrected character string and is registered. Correction content is, specifically, a character string corrected and confirmed by a user or its abstracted character string (or representation) and an error pattern indicating the characteristic of the user correction (correction characteristic) to be described later. The error pattern is generated by the character string comparison means 309. Note that specific processing of this step will be described using a flowchart shown in FIG. 8.

In S410, data is registered in the system, and the entire processing is completed.

[Character String Revision on an Item Value]

Figure 7:
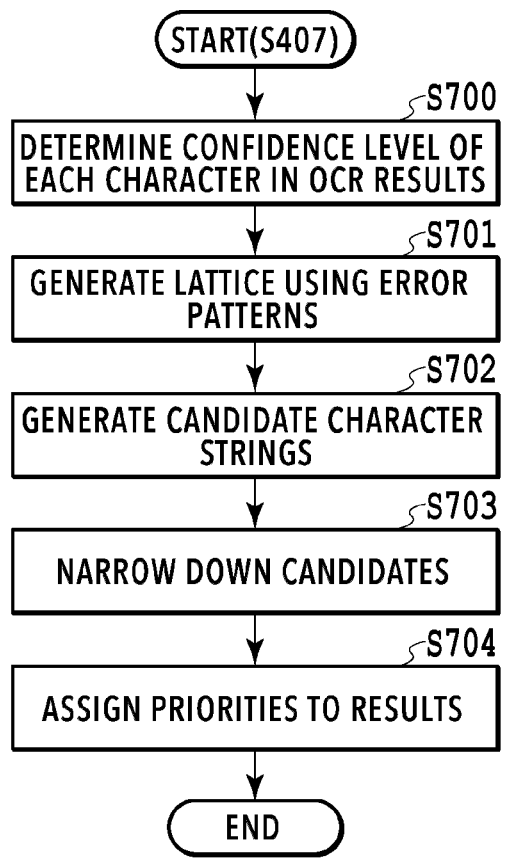
FIG. 7 is a diagram illustrating the process of correcting an item value.

With reference to FIG. 7, a description is given of character string revision on an item value performed in S407 in FIG. 4.

Figure 11:
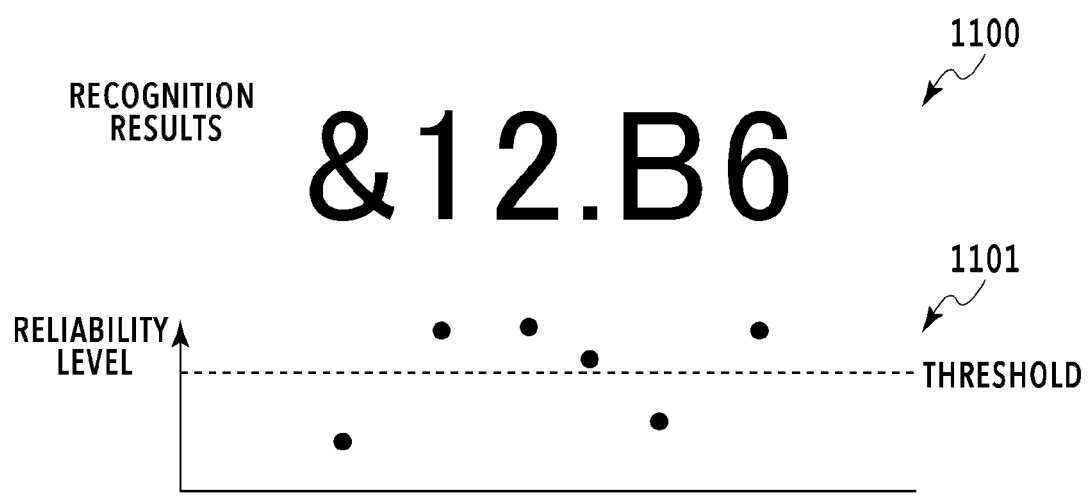
FIG. 11 is a diagram showing a distribution of the reliability levels of characters obtained as a result of character recognition.

First, in S700, the confidence level determination unit 311 performs confidence level determination on each character of OCR results. In the confidence level determination, it is determined, for an OCR result of each character obtained by OCR processing, whether a score indicating the likelihood of correctness of the OCR result, i.e., a value indicative of its reliability level, is equal to or above a preset threshold. For instance, a case is discussed here where the item value "$112.86" of the item name "Total amount" has been recognized as "&12.B6" as OCR results. FIG. 11 shows a distribution of reliability level values for the characters of these OCR results. A broken line on a distribution 1101 indicates the threshold for determining the confidence levels of the OCR results. In this example, the reliability levels of "&" and "B" are below the threshold, and the reliability levels of the other characters are above the threshold and therefore high. In this case, the confidence level determination unit 311 determines that "&" and "B" have a low level of confidence and that the other characters have a high level of confidence.

Although a common reliability threshold is used for all characters of the OCR results to determine the confidence levels thereof here, a different threshold may be used for each character. Also, the confidence level determination may be performed with any means as long as the method can evaluate the likelihood of accurateness of an OCR result. For example, a voting-type confidence level determination means using a plurality of character recognition means (OCR engines) may be used.

In S701, by reference to the confidence level determination results obtained in S700 and error patterns for the characters, a lattice is generated to generate revision character string candidates for the OCR results. A lattice is a structure for generating revision character string candidates, like the one shown in FIG. 9 (details will be given later). An error pattern is a character falsely recognized by an OCR engine (OCR error character) and its correct character that are associated with each other and registered. For instance, in a case where OCR results show "Kiyan0 Inc." and a correct character string is "Kiyano Inc.", an error pattern obtained from these is the following relation: an OCR error character "0" and a correct character "o". Error patterns are managed by the correction result management unit 312 implemented by the HDD 114 or the database 122. Error patterns may be ones acquired from user corrections of character strings in S409, or ones generated in advance and registered in the HDD 114 of the information processing apparatus 110 or the database 122 of the data management apparatus 120, or a combination of both.

In S702, revision character string candidates are generated based on the lattice generated in S701.

In S703, the revision character string candidates generated in S702 are narrowed down. A specific description is given below of how to generate and narrow down revision character string candidates.

Figure 9:
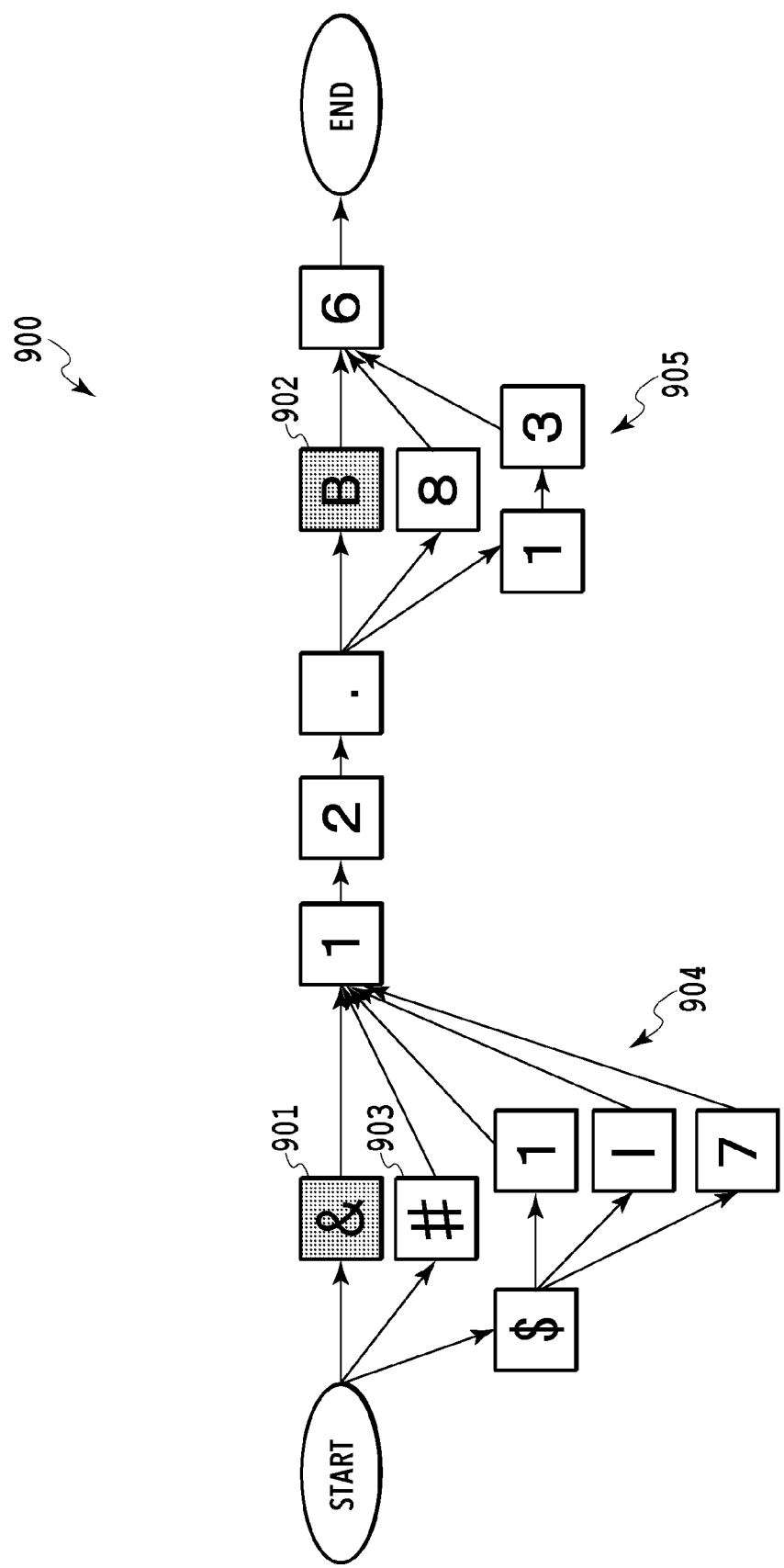
FIG. 9 is a diagram showing a lattice for generating revision character string candidates.

Reference numeral 900 in FIG. 9 denotes a lattice for a character string to be corrected, which is in this case the OCR results "&12.B6". The lattice is defined based on lower-ranked candidates for the OCR results or error patterns for characters or character strings managed by the information processing apparatus 110 or the data management apparatus 120. A lower-ranked candidate is an OCR result which is likely to be correct after a given OCR result, and for instance, "#" denoted by 903 in FIG. 9 is a lower-ranked candidate for "&" obtained as an OCR result. An error pattern is a candidate registered in advance for an image from which "&" is obtained as an OCR result, and "$1", "$1", and "$7" denoted by 904 are other lower-ranked candidates that are registered. The error patterns used may be ones registered in the information processing apparatus in advance as described above or ones acquired based on the history of user corrections on OCR results. The present example is described including the latter case of acquiring error patterns. The acquisition of error patterns is performed in S409 of the flowchart in FIG. 4, and a specific means will be described later in relation to [Detect and Register Correction Content].

The lattice 900 is formed using error patterns or lower-ranked candidates of OCR results, but lattice nodes are added only to the portions determined in S700 as having a low level of confidence, like the ones denoted by 903 to 905. This is because it is unnecessary to or better not to consider replacing a character that is not an OCR error character with another character. More specifically, in a case where lattice nodes are permitted to be added to not only the characters with a low level of confidence but all characters of the OCR results including ones with a high level of confidence, the number of revision character string candidates to be described later increases accordingly, which increases the processing time. Furthermore, there is a concern that the increase in the options may lower the probability of a correct character string being selected in the later narrowing down of the revision character string candidates, and therefore may lower revision accuracy.

In the case of the present example, the portions determined in S700 as having a low level of confidence are "&" and "B", and hence in the lattice 900 in FIG. 9, revision candidates are generated only for "&" and "B" that are shaded and denoted by 901 and 902, respectively. Thus, there is no need to generate candidates for the other portions in the character string, which reduces the number of patterns of the revision character string candidates generated.

The revision character string candidates are generated by selecting all the possible paths that the generated lattice 900 provides. Specifically, a total of 15 patterns of revision character string candidates are generated from the lattice 900, namely, "&12.B6", "&12.86", "&12.136", "#12.B6", "#12.86", "#12.136", "$112.B6", "$112.86", "$112.136", "$112.B6", "$112.86", "$112.136", "$712.B6", "$712.86", and "$712,136".

In S703, the candidates are further narrowed down based on knowledge set for the item value. Here, using the knowledge that "a monetary amount does not take characters other than $ and numbers," the candidates are narrowed down to "$112.86", "$112.136", "$712.86", and "$712.136", Further, as a rule for monetary amount notation, the knowledge that "two digits are on the right side of a dot" and "a comma is put for every three numbers on the left side of a dot" is used to further narrow down the above to "$112.86" and "$712.86".

As another piece of knowledge, a number-abstracted representation "$000.00" or a regular expression "¥b$¥d{1, 3}(¥d{3})*.¥d{2}¥b" which is a format for an item value for "Total amount" obtained from a history of user corrections in the past may be used. Because a requirement to conform to such a format is thus set as a condition to be met by a revision character string candidate, the candidates can be narrowed down to the above two candidates. A format set for an item value, like the one above, is managed by the correction result management unit 312. The step of acquiring a character string or a format from a user correction history is performed in S409, and a specific means will be described later in relation to [Detect and Register Correction Content]. The acquisition of a character string obtained from user correction results or an abstracted format thereof is managed by the correction result management unit 312 implemented by the HDD 114 or the database 122. Alternatively a predefined format registered in advance in the HDD 114 of the information processing apparatus 110 or in the database 122 of the data management apparatus 120 may be used. For example, a format such as the one given above can be registered and used for a monetary amount, and a format such as "¥{2}¥d{4}¥d {4}" can be registered and used for a telephone number. Alternatively, both of a format obtained from a user and a predefined format can be used.

Note that the above-described means to narrow down candidates from character strings generated using a lattice is merely an example, and various other means are also conceivable. For instance, for an item name "Name," the knowledge that "no number is included" may be used. It is also possible to narrow down candidates using a means to select the most likely path by giving a lattice the occurrence probabilities of characters and the transition probabilities of adjacent characters with regard to general item values.

In S704, in a case where there are a plurality of candidates, priority levels are determined for the candidates based on information obtained from the user correction history. In the example where the character string to be corrected is "&12.B6", there are still two revision character string candidates "$112.86" and "$712.86" even after the candidates are narrowed down in S703. In this case, the priority level of each of the revision character string candidates is determined based on, for example, information indicating the usage frequencies of character strings confirmed by a user in the past or information on value ranges confirmed by a user in the past or the like. For instance, in a case where there is information indicating that only item values in the range of $0 to $5.00 have been inputted for the item "Total amount" before, the priority level of the candidate "$112.86" is set to be higher than that of the candidate "$712.86". As another example, in a case where "Kiyano Inc." and "kiyano Inc." are obtained as revision results, their priority levels can be determined based on information indicating the usage frequencies of character strings confirmed by a user in the past. Specifically, in a case where there is information indicating that a user has inputted and confirmed "Kiyano Inc." ten times and "kiyano Inc." twice in the past for an item "Company name," the priority level of "Kiyano Inc." is set higher.

It is also possible to determine the priority levels based not only on the usage frequencies, but also on usage recentness, i.e., the more recent the usage, the higher the priority level. For instance, a case is discussed here where the user has inputted "Kiyano Inc." ten times and "kiyano Inc." twice in the past. "Kiyano Inc." is more frequently used, but in a case where "kiyano Inc." has been confirmed most recently for an item "Company name," the priority level of the candidate "kiyano Inc." is set higher. This allows the most recent result of user correction to be reflected regardless of the past usage frequency. Note that a publicly known technique typified by, e.g., kana-kanji conversion can also be used for the determination of priority levels.

With the above, all the steps in FIG. 7 are completed, ending the processing to revise a character string of an item value, which is the processing in S407 in FIG. 4. In a case where only one revision result is displayed as indicated by 603 in FIG. 6, the revision character string candidate with the highest priority level is displayed. In a case where a list of revision character string candidates is displayed as shown in FIG. 10, the revision character string candidates are displayed on the list 1003 in the order of priority.

[Obtaining User Correction and Registering Correction Content]

Figure 8:
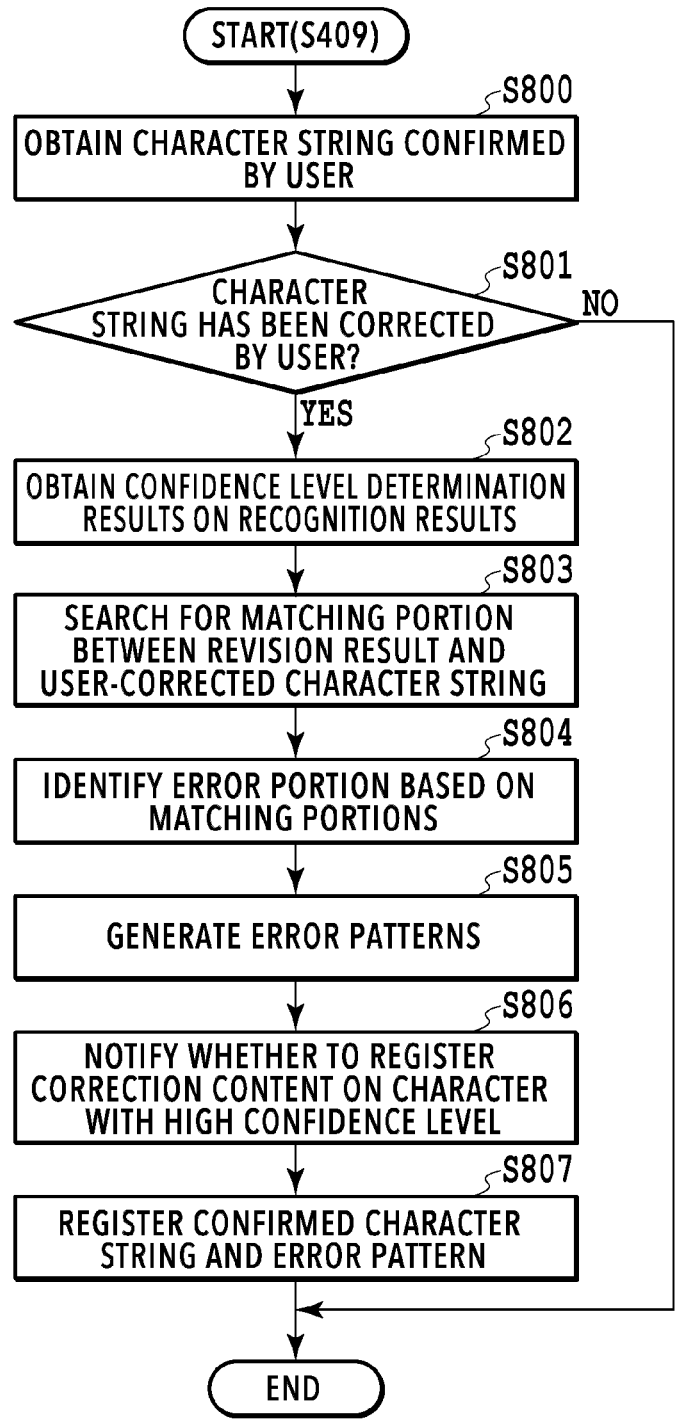
FIG. 8 is a diagram illustrating the process of acquiring the content of a correction made by a user.

With reference to FIG. 8, a description is given of obtaining a user correction and registering correction content in S409 in FIG. 4. The processing below is executed for each item value.

First in S800, a character string confirmed by a user is obtained. A confirmed character string is a character string which is in 603 in FIG. 6 in the event where the CONFIRM button 605 is pressed, i.e., YES in S408.

In S801, it is determined whether the character string has been corrected by a user. Specifically, it is determined that the character string has been corrected by a user in a case where the character string before user correction, i.e., the character string outputted as a result of S407, is different from the character string confirmed by the user and obtained in S800.

In S802, the confidence levels of the OCR results are obtained. The confidence levels obtained are based on the determination results on the reliability levels of the OCR results obtained in S700. As to characters the OCR results of which have been replaced by the item value revision in S407, the original characters of the OCR results have been overwritten by the character string revision, and the confidence level determination results thereon are therefore unavailable. Thus, the confidence level determination results on characters other than those characters are obtained.

In S803, the revision result in S407 and the user-corrected character string are compared with each other to find a matching portion. In a case discussed below, OCR results containing false recognition cannot be revised to a correct character string, and "&12.B6" is obtained as a revision result in S407. Since no character string revision is performed in S407 in this case, the confidence level determination results on all the characters can be used. In a case where the character string before user correction is "&12.B6" and the character string after user correction is "$112,86", the matching portions are, from the beginning, "1", "2", and "6". For example, a graph obtained by calculation of the edit distance between two character strings may be used to find the matching characters. Note that in the example assumed here, the user makes a mistake and inputs a character "," instead of the correct character ".".

In S804, a discrepant portion, which is a portion other than the matching portions found in S803, is detected. Discrepant portions in the above example are "&", ".", and "B". Note that "." is not incorrect but is detected as a discrepancy portion here because it is different from the character inputted by the user. The identifying of the discrepant portions is performed by a discrepant portion identification means (not shown).

In S805, error patterns are generated for the discrepant portions identified. Because the matching portions and the discrepant portions between the character string before user correction and the character string after user correction have been detected by the processing in S803 and S804, error patterns are generated using these pieces of information, each error pattern defining a pair of pre- and post-replacement characters. Error patterns generated in the above example are "&"→"$1", "." →",", and "B" →"8".

Note, however, that in a case where the character detected in the processing S804 as an error portion is the same as the character obtained as a result of the revision in S407, no error pattern is generated in S805 for that character even in a case where the character has been corrected by the user. This is because the error portion detected here should be regarded not as error in the OCR result, but as error in the revision result. Because the revision result of the character string has been corrected by the user in this case, it means that the user rejected the character string revision. An example of processing performed in this case is deleting, or lowering the relative importance or priority of, information used in the revision of this character string in S407, the information having been stored up to S804 and S805 and managed by the correction result management unit 312.

In S806, the user is notified that the user is trying to correct a character with a high level of confidence. Among the error patterns generated in S805, i.e., (1) "&" →"$1", (2) "." →" ",", and (3) "B" →" "8", (2) "." →" "," is a correction on the character "." which has been determined as having a high level of confidence according to the confidence level determination results obtained in S802. Thus, the user correction (2) "." →" "," is likely to be a miscorrection, and there is a high possibility that the pre-correction OCR result is correct. Thus, a notification is displayed, prompting the user to check the correction content.

Figure 12:
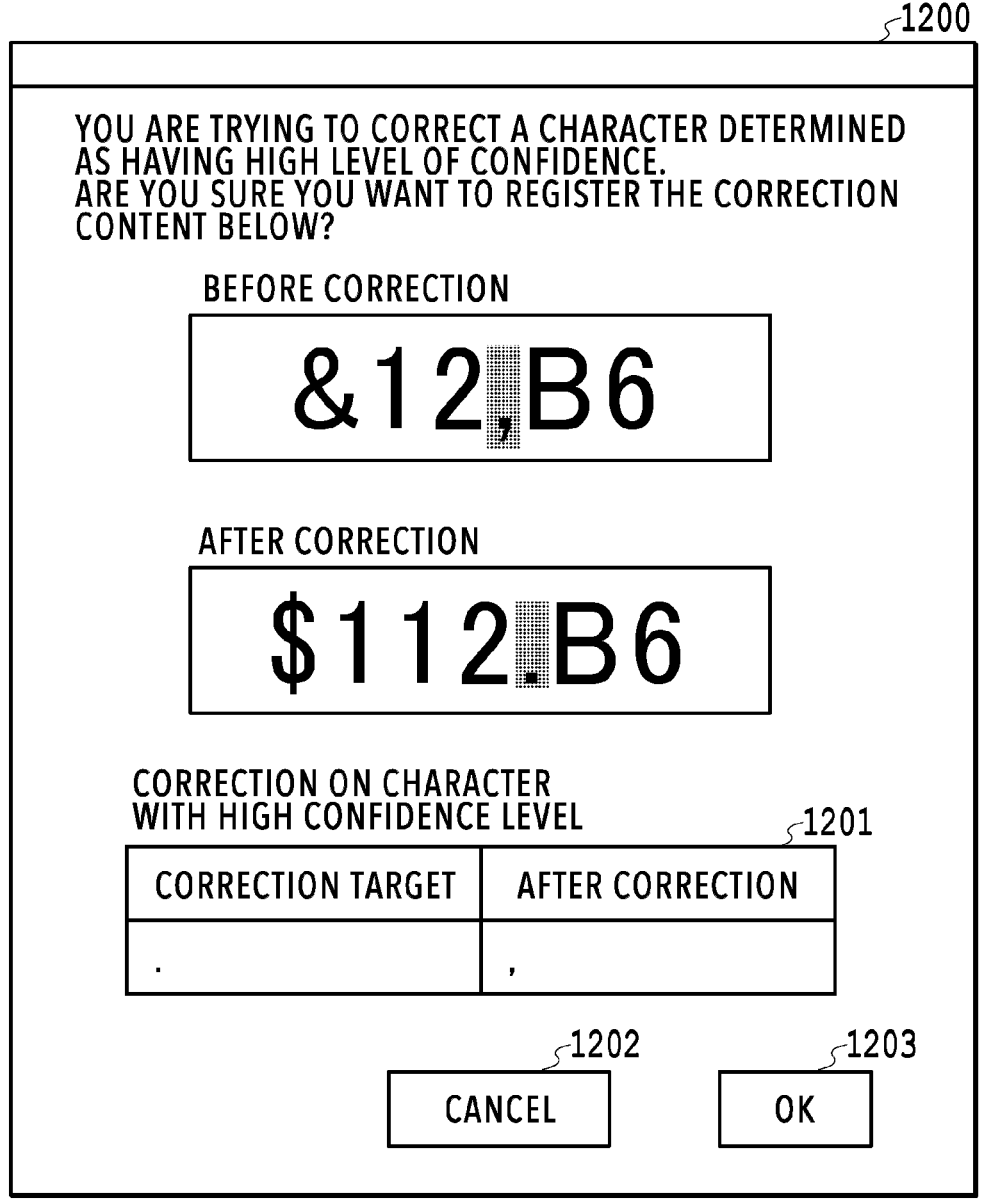
FIG. 12 is a diagram showing an example of a screen for pointing out that a user might have made a miscorrection.

Reference numeral 1200 in FIG. 12 shows an example of a notification displayed for the user in the processing in S806. The notification informs the user that the correction from "." to "," may be incorrect, using a form such as the table denoted by 1201. This can prevent the user from making a miscorrection without noticing inputting error. At the same time, a button is displayed for selecting whether to register the correction content by ignoring the control of registration content based on the confidence level determination result. This is to assume the possibility of error in confidence level determination. For instance, there may be a case where a character of an OCR error portion is erroneously determined as having a high level of confidence. Then, in that case, a user correction on the OCR error character cannot be registered. To avoid this, a button for selecting to register the user correction is displayed. To register a correction on a character regarding which a notification on is being given to indicate its high confidence level determination, the user can register the correction content by pressing down an OK button 1203 in FIG. 12, ignoring the high confidence level determination result. In a case where there are a plurality of items in the table 1201, a configuration may be employed which allows the user to select a desired item from the plurality of items. In a case of not registering the correction content, the user can end the processing without registering the content by pressing a CANCEL button 1202.

Even in a case where a user makes a miscorrection, the above-described error pattern generation processing using confidence level determination can avoid generation and registration of an error pattern for the character thus corrected. In this way, a possibility of generating an incorrect candidate is lowered in the generation of revision character string candidates using error patterns in the processing in S407, and therefore an improvement in the accuracy of character string revision can be expected.

In S807, the character string confirmed by the user and obtained in S806 and the error patterns generated in S805 are registered in the correction result management unit 312. A confirmed character string is registered as follow. In a case of a character string containing no number such as, e.g., "Kiyano Inc.", the character string "Kiyano Inc." is registered. Alternatively, the character string may be split into words, "Kiyano" and "Inc." and registered. In a case of a character string containing a number such as, e.g., "$112, 86", a character string in which numbers are each abstracted is registered. For example, abstraction is to replace numbers with any given number such as "0", and in the case of "$112,86", the abstracted character string is "$000.00". This abstraction may instead be replacement into a regular expression. In the case of "$112,86", the abstracted character string is "¥b$¥d{1,3}(,¥d{3})*.¥d{2}¥b". This operation is performed because in a case of a character string formed by numbers, it is easily assumable that different business forms have different numbers written thereon even in a case where the category of the business forms to be handled or the location where the character string is written is the same.

The error patterns thus registered are used for the next and later generation of the lattice 900. Also, the character string confirmed by the user and registered is used to narrow down the revision character string candidates in S703. A specific method for this is as described in relation to the item value correction in S407, Note that in a case where an error pattern to register or a character string confirmed by a user and to be registered is already registered in the correction result management unit 312, the usage frequency thereof may be counted. This information may be used in determining the weights or priority levels of the revision character string candidates generated for revision.

First Modification of the First Embodiment

In the item value revision in S407 in the first embodiment, replacement candidates are generated only for a portion determined by the confidence level determination unit 311 as having a low level of confidence, the replacement candidates being generated using lower-ranked candidates or error patterns for each character for generating revision character string candidates. However, there may be a case where the confidence level determination is faulty, i.e., an OCR error character is determined as having a high level of confidence.

In this case, for such a character erroneously determined in its confidence level, replacement candidates cannot be generated by considering the lower-ranked candidates and using error patterns, and a revision character string candidate which is likely to be a correct character string cannot be generated.

In view of such circumstances, it is conceivable to additionally determine whether to generate replacement candidates using lower-ranked candidates and error patterns depending on the type of the character. Specifically, upon appearance of a character which has set in advance as a learning target because it is likely to be erroneously determined in its confidence level, replacement candidates are generated for this character regardless of the result of confidence level determination. For instance, "l" is likely to be falsely recognized as "1" because depending on the font, their character shapes are extremely similar, Thus, an OCR engine that recognizes characters using the similarities of character shapes may determine that a character has a high level of reliability even in a case where the character is falsely recognized, Character types that are hard to be distinguished from other character codes are set as learning targets in advance because they tend to be erroneously determined in its confidence level due to the characteristics of an OCR engine. Thus, data including a list of character types that tend to be erroneously determined in confidence level is stored in the HDD 114 of the information processing apparatus 110 or the database 122 of the data management apparatus 120 in advance. In the event where a character type that is in the list appears as an OCR result, permission is given to generate, on the lattice 900, replacement candidates using recognition lower-ranked candidates and error patterns, regardless of the result of confidence level determination. This can help prevent lowering the accuracy of character string revision due to erroneous confidence level determination. This can also help prevent displaying a notification for prompting a user to check correction content despite the fact that the possibility of the user correction being a miscorrection is not high.

Second Modification of the First Embodiment

A configuration may be employed in which a user can edit error patterns and user-confirmed character strings managed by the correction result management unit 312 in the first embodiment. For example, in such a configuration, a user can edit the information using the touch panel 202 of the information processing apparatus 110 or a display coupled to a PC and can add and delete information being managed. Such editing is performed by, for example, a system manager of each tenant. This configuration allows a user to delete registered correction content in a case where the correction is a miscorrection. As a result, character string correction tailored to the needs of a user can be performed.

Second Embodiment

Figure 13:
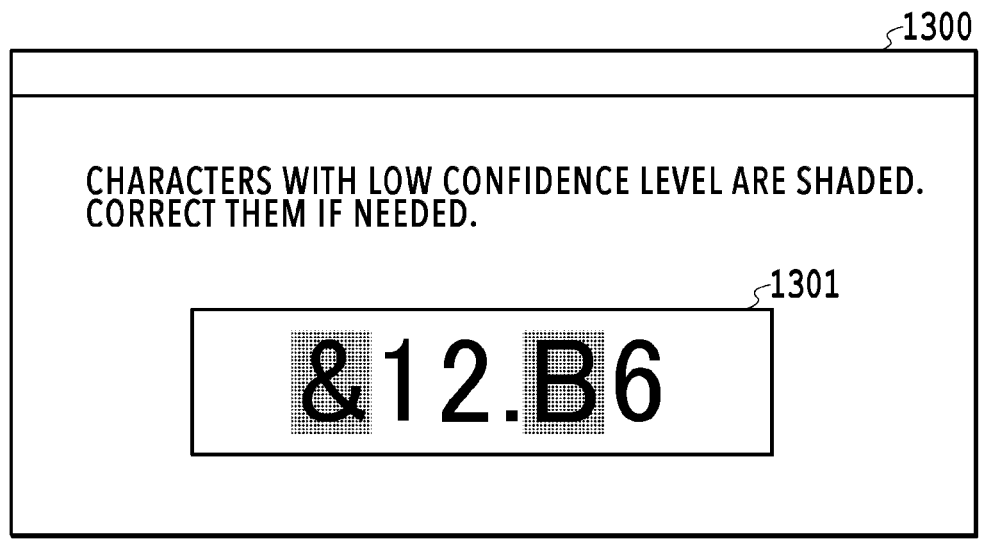
FIG. 13 is a diagram showing an example of a screen in a second embodiment for displaying the confidence levels of characters obtained as a result of character recognition.

In the configuration of the first embodiment, after a user corrects a character string, a miscorrection is pointed out as shown in FIG. 12 upon detection of a correction on a character with a high level of confidence. Instead, the following configuration may be employed. Specifically, a confidence level determination result display means (not shown) may be included to add confidence level determination results to a pre-correction character string and display them together. In this configuration, before making any corrections, the user can check, in OCR results or a character string obtained as a result of item value revision in S407, a portion that has a low level of confidence and that is likely to need correction. Specifically, as shown at 1300 in FIG. 13, a character with a high level of confidence and a character with a low level of confidence are displayed in different manners using superimposition on the character string so as to be distinguishable from each other. This is displayed on, for example, the touch panel 202 of the information processing apparatus 110 or a display coupled to a PC. At 1301 in FIG. 13, "&" and "B" which are characters with a low level of confidence are shaded so that the user can know the portions to correct before making any corrections. This can prevent miscorrection by a user, which improves accurateness of the error patterns or character strings to be registered, and therefore improvement in the accuracy of character string revision can be expected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can prevent learning a miscorrection made by a user on an OCR result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-037211 filed Mar. 9, 2021, which is hereby incorporated by reference wherein in its entirety,

What is claimed is:

1. An information processing apparatus comprising:
at least one memory that stores instructions; and
at least one processor that executes the instructions to:
extract a character string containing at least one character by performing character recognition on an image obtained by scanning of a document, wherein each of the at least one character included in the extracted character string has a reliability level of the character recognition;

display the extracted character string on a display apparatus;

obtain a corrected character string by replacing a first character included in the extracted character string with a second character based on a user's correction instruction, wherein the corrected character includes the second character; and learn a correction characteristic of a difference portion between the extracted character string and the corrected character string in a case where the reliability level of the character recognition performed for the first character corresponding to the difference portion is below a predetermined threshold, wherein the correction characteristic of the difference portion is not learned in a case where the reliability level of the character recognition performed for the first character corresponding to the difference portion is equal to or above the predetermined threshold.

2. The information processing apparatus according to claim 1, wherein the correction characteristic includes an error pattern having the first character before replacement and the second character after replacement registered in association with each other.

3. The information processing apparatus according to claim 2, wherein the correction characteristic includes a representation obtained by abstracting a number included in the corrected character string.

4. The information processing apparatus according to claim 2, wherein the at least one processor executes the instructions further to generate a revised character string by performing character replacement on a new extracted character string based on the learned correction characteristic, wherein the revised character string is displayed on the display apparatus.

5. The information processing apparatus according to claim 4, wherein the revised character string is generated by replacing the first character which is included in the new extracted character string with the second character based on the learned correction characteristic.

6. The information processing apparatus according to claim 5, wherein a priority level of the revised character string is determined based on usage frequency of at least part of a pair of characters before and after replacement used in the revised character string.

7. The information processing apparatus according to claim 5, wherein a priority level of the revised character string is determined based on usage recentness of at least part of a pair of characters before and after replacement used in the revised character string.

8. The information processing apparatus according to claim 5, wherein the revised character string is generated based on the learned correction characteristic by replacing the first character which is included in the new extracted character string with the second character which is a lower-ranked candidate obtained by the character recognition.

9. The information processing apparatus according to claim 1, wherein the extracted character string is displayed on the display apparatus with an indication indicative of the reliability level for each of the at least one character included in the extracted character string.

10. The information processing apparatus according to claim 1, wherein the correction characteristic is editable by a user.

11. A non-transitory computer readable storage medium storing a program that causes a computer to execute an information processing method comprising:

extracting a character string containing at least one character by performing character recognition on an image obtained by scanning of a document, wherein each of the at least one character included in the extracted character string has a reliability level of the character recognition;

displaying the extracted character string on a display apparatus;

obtaining a corrected character string by replacing a first character included in the extracted character string with a second character based on a user's correction instruction, wherein the corrected character includes the second character; and learning a correction characteristic of a difference portion between the extracted character string and the corrected character string in a case where the reliability level of the character recognition performed for the first character corresponding to the difference portion is below a predetermined threshold, wherein the correction characteristic of the difference portion is not learned in a case where the reliability level of the character recognition performed for the first character corresponding to the difference portion is equal to or above the predetermined threshold.

\* \* \* \* \*